(12) United States Patent
Lin et al.

(10) Patent No.: US 12,089,563 B2
(45) Date of Patent: *Sep. 17, 2024

(54) SHOWER HEAD FOR PETS

(71) Applicant: FUJIAN XIHE SANITARY WARE TECHNOLOGY CO., LTD., Fujian (CN)

(72) Inventors: Xiaofa Lin, Fujian (CN); Xiaoshan Lin, Fujian (CN); Zhiwei Chen, Fujian (CN); Feiming Deng, Fujian (CN); Xiaoqing Deng, Fujian (CN); Qiqiao Liu, Fujian (CN)

(73) Assignee: FUJIAN XIHE SANITARY WARE TECHNOLOGY CO., LTD., Fujian (CN)

( * ) Notice: Subject to any disclaimer, the term of this patent is extended or adjusted under 35 U.S.C. 154(b) by 484 days.

This patent is subject to a terminal disclaimer.

(21) Appl. No.: 17/503,373

(22) Filed: Oct. 18, 2021

(65) Prior Publication Data
US 2022/0159927 A1 May 26, 2022

(30) Foreign Application Priority Data
Nov. 20, 2020 (CN) .......................... 202011313721.X

(51) Int. Cl.
*A01K 13/00* (2006.01)
*B05B 1/18* (2006.01)
*B05B 1/30* (2006.01)

(52) U.S. Cl.
CPC ............ *A01K 13/001* (2013.01); *B05B 1/185* (2013.01); *B05B 1/3026* (2013.01)

(58) Field of Classification Search
CPC ...... A01K 13/001; B05B 1/185; B05B 1/3026
USPC ........................................................ 134/95.3
See application file for complete search history.

(56) References Cited

U.S. PATENT DOCUMENTS

| 2003/0062426 A1* | 4/2003 | Gregory | ................ B05B 15/528 239/533.13 |
| 2013/0032647 A1* | 2/2013 | Zhou | .................... B05B 1/1654 239/562 |

* cited by examiner

*Primary Examiner* — Tinsae B Ayalew
(74) *Attorney, Agent, or Firm* — JCIPRNET

(57) ABSTRACT

A shower head for pets includes a shower head body having a water inlet channel, a first leather cup, a water dispensing plate located between the shower head body and the surface cover assembly, a surface cover assembly, and an adjusting device having driving and rotating mechanisms. A first water outlet communicating with the water inlet channel penetrates the first leather cup. Two sides of the water dispensing plate respectively cooperate with the shower head body and the surface cover assembly to enclose an installation cavity and a water outflow cavity. A first water passage hole communicating with the water outflow cavity penetrates the water dispensing plate. The surface cover assembly has multiple comb teeth. A second water passage hole penetrates the rotating mechanism, and the rotating mechanism abuts against the first leather cup and the water dispensing plate. The driving mechanism drives the rotating mechanism to rotate to adjust a water outflow area.

8 Claims, 10 Drawing Sheets

SHOWER HEAD FOR PETS

CROSS-REFERENCE TO RELATED APPLICATION

This application claims the priority benefit of China application serial no. 202011313721.X, filed on Nov. 20, 2020. The entirety of the above-mentioned patent application is hereby incorporated by reference herein and made a part of this specification.

BACKGROUND

Technical Field

The disclosure relates to a field of sanitary products, and in particular, relates to a shower head for pets.

Description of Related Art

Regarding the shower heads for pets currently available on the market, axial rocker structures are generally adopted for adjusting the amounts of flowing, and adjustment may only be made at large angles or at a single angle. Further, the adjusting devices used in these shower heads for pets are completely soaked in water, and the resistance that needs to be overcome when pressing and adjusting are performed is relatively large. In most of the shower heads for pets, the pause function is not provided in the shower head bodies, but when washing a pet, the shower head often has to be turned off temporarily. As a result, every time when the shower head needs to be turned on or off, the user has to go near the water outflow switch to turn on or off the shower head. Since walking back and forth takes time and effort, poor user experience is provided.

SUMMARY

The following is a brief description of the subject to be explained in detail in the specification, and the brief description is not intended to limit the protection scope of the claims.

To accomplish the foregoing purpose, the following technical solutions are adopted.

The disclosure provides a shower head for pets including a shower head body, a first leather cup, a water dispensing plate, a surface cover assembly, and an adjusting device. The shower head body is provided with a water inlet channel. The first leather cup is installed on the water inlet channel, and a first water outlet communicating with the water inlet channel penetrates the first leather cup. The water dispensing plate is located between the shower head body and the surface cover assembly and hermetically encloses an installation cavity and a water outflow cavity respectively together with the shower head body and the surface cover assembly, and a first water passage hole communicating with the water outflow cavity penetrates the water dispensing plate. The surface cover assembly is provided with a plurality of comb teeth extending in a direction away from the water dispensing plate. The adjusting device includes a driving mechanism and a rotating mechanism. The rotating mechanism is located inside the installation cavity, a second water passage hole penetrates the rotating mechanism, and the rotating mechanism hermetically abuts against the first leather cup and the water dispensing plate. The driving mechanism drives the rotating mechanism to rotate to adjust a water outflow area which is formed by an overlapped area of the first water outlet and the second water passage hole. The shower head for pets is configured to facilitate pet grooming, a flowing amount may be adjusted, and water outflowing may be paused.

BRIEF DESCRIPTION OF THE DRAWINGS

To make the technical solutions provided in the embodiments of the disclosure more clearly illustrated, several accompanying drawings required by the embodiments for description are briefly introduced as follows.

DESCRIPTION OF THE EMBODIMENTS

The accompanying drawings in the embodiments of the disclosure are included to provide a clear and complete description of the technical solutions provided in the embodiments of the disclosure. Obviously, the described embodiments are preferred embodiments of the disclosure, and should not be regarded as exclusion of other embodiments. Based on the embodiments of the disclosure, all other embodiments obtained by a person of ordinary skill in the art without making any inventive effort fall within the scope that the disclosure seeks to protect.

Figure 1:
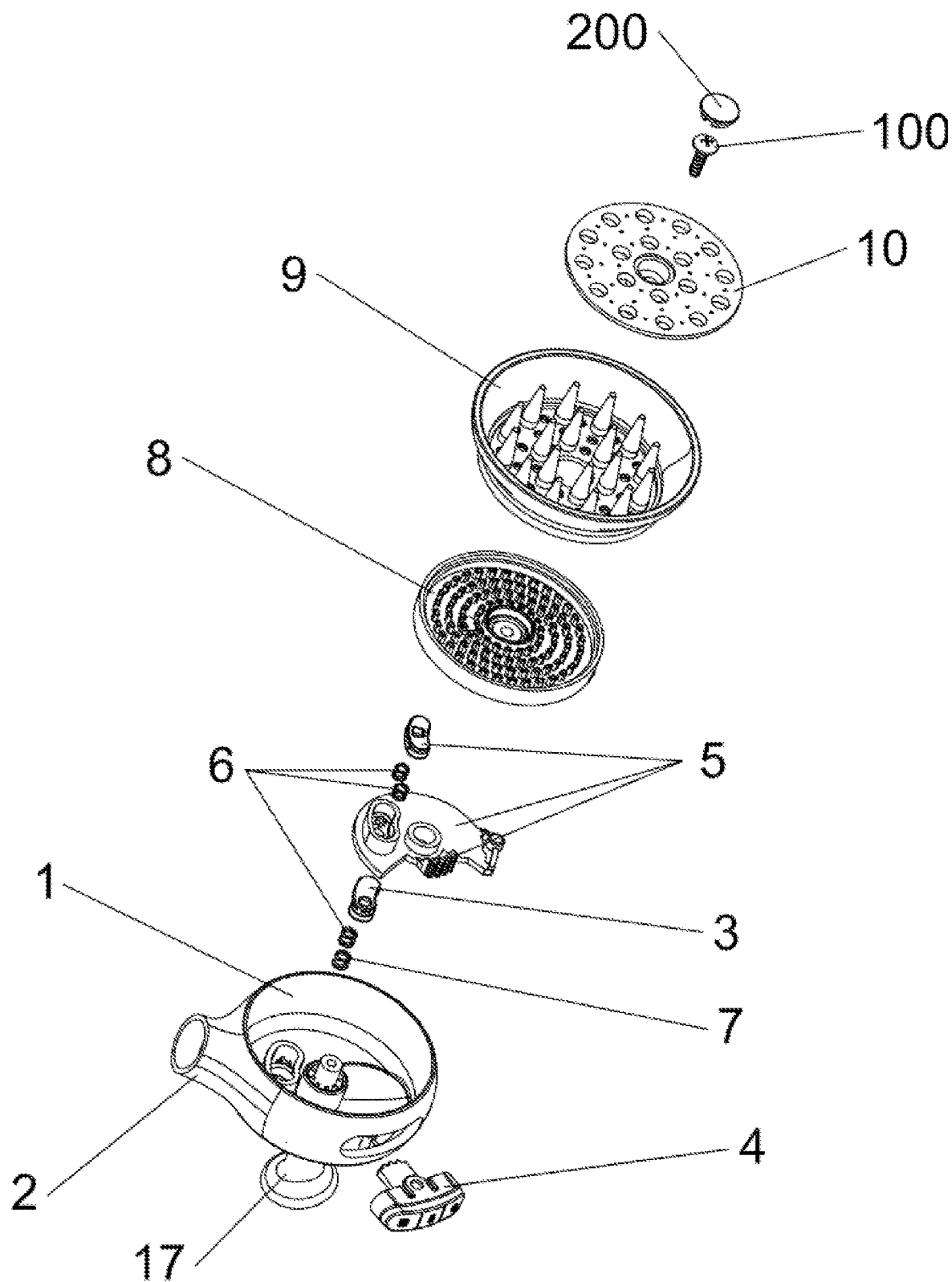
FIG. 1 is a three-dimensional exploded view of a shower head for pets according to an embodiment of the disclosure.

With reference to FIG. 1, FIG. 1 illustrates a shower head 300 for pets including a shower head body, a first leather cup 3, an adjusting device, first elastic members 6, a second elastic member 7, a water dispensing plate 8, a surface cover assembly, a screw 100, and a decoration cover 200.

Figure 2:
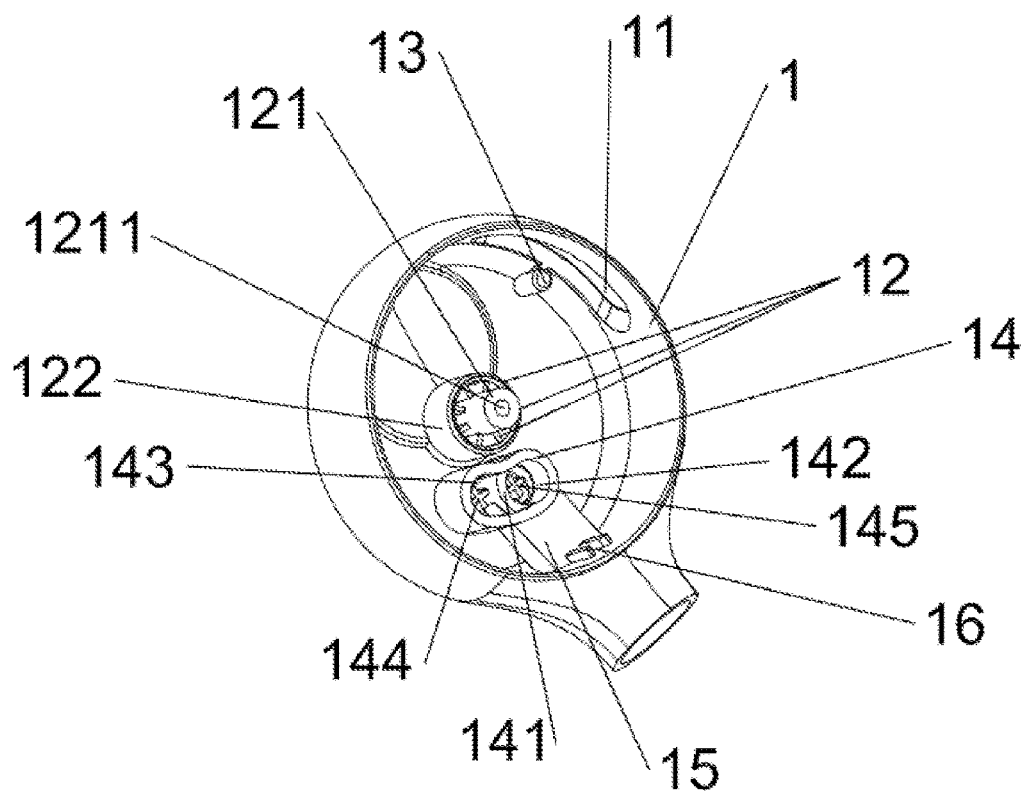
FIG. 2 is a three-dimensional schematic view of a structure of a shower head body according to an embodiment of the disclosure.

Specifically, as shown in FIG. 1 and FIG. 2, the shower head body includes a head portion 1 and a handle portion 2. The head portion 1 generally is a cylinder structure having an open end, and a button installation hole 11 penetrates a side wall of the cylinder. An inner wall of a bottom portion of the cylinder is provided with a first rotating shaft 12, a second rotating shaft 13, a first installation groove 14, an irregular column 115, and an inserting groove 16. An outer wall of a bottom portion of the head portion 1 is provided with a hand fastener 17 extending in a direction away from the open end of the head portion 1, and arrangement of the hand fastener 17 may facilitate hand grip.

Figure 15:
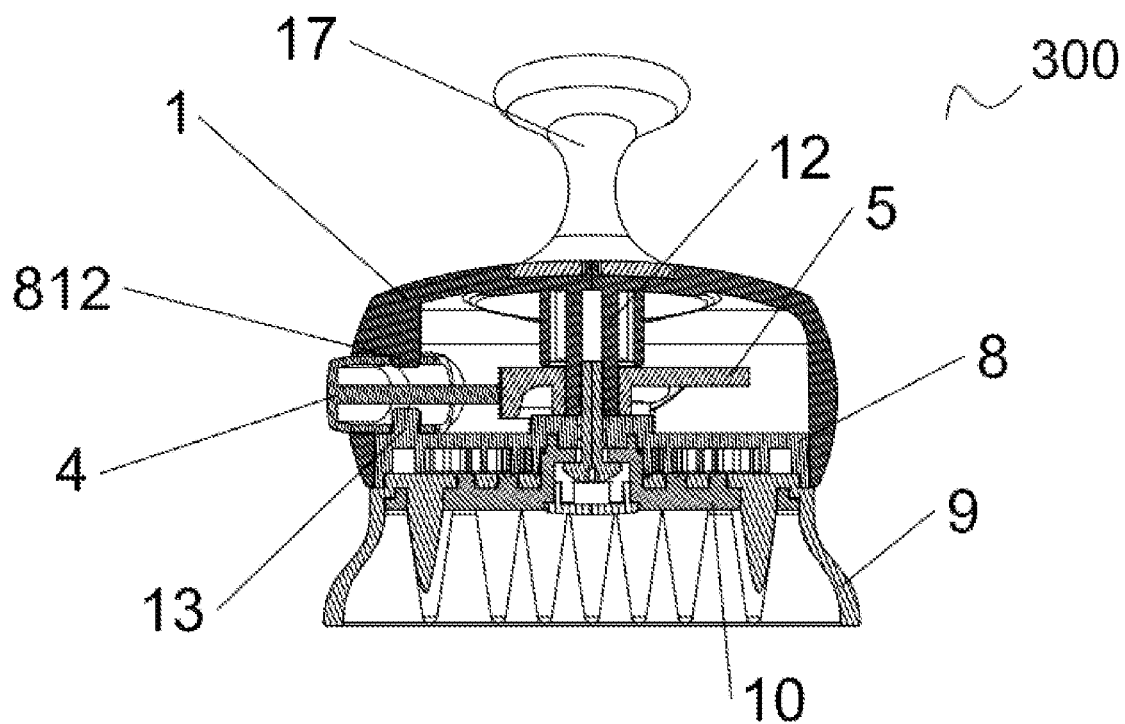
FIG. 15 is a cross-sectional schematic view taken along a line B-B in FIG. 13 according to an embodiment of the disclosure.

As shown in FIG. 2 and FIG. 15, the first rotating shaft 12 includes a rotating shaft body 121, a first ring wall 122, and a plurality of first protruding columns. The rotating shaft body 121 extends in a direction from a central position of the inner wall of the bottom portion of the head portion 1 towards the open end of the head portion 1. A central position of the rotating shaft body 121 is provided with a threaded hole 1211. The first ring wall 122 is coaxial with the rotating shaft body 121, extends from the inner wall of the bottom portion of the head portion 1 towards the opening direction of the head portion 1, and surrounds outside the rotating shaft body 121 with a gap. The first protruding columns are disposed in the gap between the rotating shaft body 121 and the first ring wall 122, and are spaced apart from each other in a circumferential direction of the rotating shaft body 121. A free end surface of the first ring wall 122 forms a position-limiting surface, and the position-limiting surface allows a space to be kept between the rotation plate 51 and a cavity wall of the head portion 1 opposite to the water dispensing plate 8, so as to facilitate rotation of the rotation plate 51.

As shown in FIG. 2, the second rotating shaft 13 extends from the inner wall of the bottom portion of the head portion 1 towards the open end of the head portion 1 and is arranged close to the button installation hole 11.

As shown in FIG. 2, the first installation groove 14 is disposed adjacent to the rotating shaft body 121, and the first installation groove 141 extends from the inner wall of the bottom portion of the head portion 1 towards the open end of the head portion 1. An arc-shaped partition 141 is disposed in the first installation groove 14 and divides the first installation groove 14 into a first groove 142 and a second groove 143. A spacing is kept between the arc-shaped partition 141 and an open end surface of the first installation groove 14. A bottom wall of the first groove 142 and a bottom wall of the second groove 143 are respectively provided with a cross-shaped protrusion 145 and a cross-shaped first protruding rib 144 extending in the opening direction of the first installation groove 14. The first groove 142 from a water passage groove.

Figure 16:
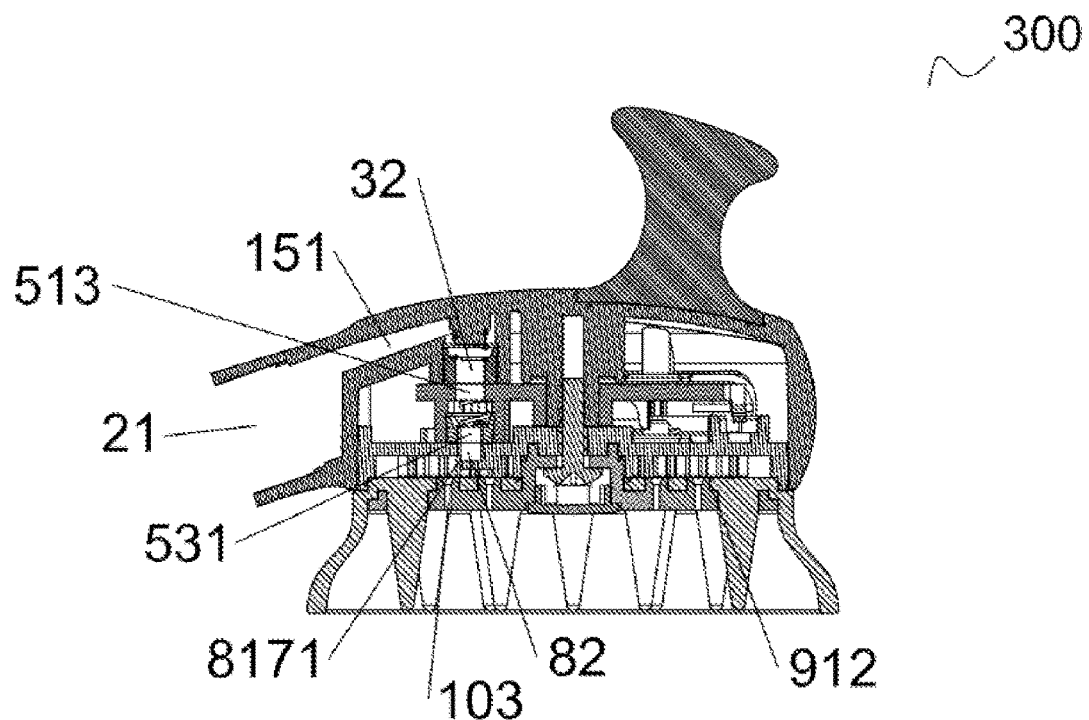
FIG. 16 is a cross-sectional schematic view taken along a line C-C in FIG. 14 according to an embodiment of the disclosure.

As shown in FIG. 2 and FIG. 16, the irregular column 15 extends from one side of the first installation groove 14 close to the side wall of the cylinder of the head portion 1 towards an outer wall of the cylinder of the head portion 1, and the irregular column 15 is provided with a first through passage 151 penetrating the outer side wall of the cylinder of the head portion 1 and the groove wall of the first installation groove 142.

As shown in FIG. 2, the inserting groove 16 includes two symmetrically arranged second protruding columns. The two second protruding columns extend from an outer wall of the irregular column 15 close to the open end of the head portion 1 towards the opening direction of the head portion 1, and one side of each of the two second protruding columns is closely attached to an inner side wall of the cylinder of the head portion 1. A gap is kept between the two second protruding columns so as to form the inserting groove 16, and the inserting groove 16 has an opening facing towards the open end of the head portion 1.

As shown in FIG. 2 and FIG. 16, one end of the handle portion 2 is fixedly connected onto the outer wall of the cylinder of the head portion 1, and a second through passage 21 penetrates the handle portion 2 internally. One end of the second through passage 21 communicates with the first through passage 151 of the irregular column 15, and the other end of the second through passage 21 is configured to communicate with an external water outlet. The first through passage 151, the second through passage 21 and the first installation groove 14 form a water inlet channel of the shower head body together.

Figure 3:
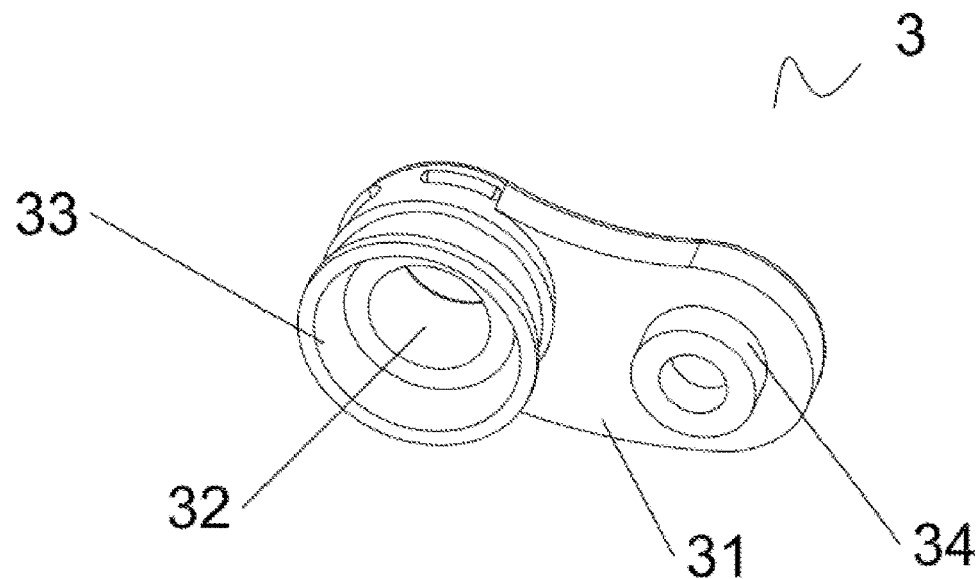
FIG. 3 is a three-dimensional schematic view of a structure of a first leather cup according to an embodiment of the disclosure.

As shown in FIG. 3, the first leather cup 3 is made of an elastic material and includes a leather cup body 31, a first water outlet 32, and a sealing sleeve 33. The first water outlet 32 penetrates the leather cup body 31, and the first water outlet 32 protrudes from a surface of one side of the leather cup body 31. An outer wall of the first water outlet 32 protruding from the leather cup body 31 is fixedly connected to the trumpet-shaped sealing sleeve 33. The sealing sleeve 33 is fitted to the water passage groove, and an outer wall of the sealing sleeve 33 is provided with a sealing protruding rib. A surface of one side of the leather cup body 31 provided with the sealing sleeve 33 is provided with a first protruding block 34 opposite to the first protruding rib 144 on a bottom portion of the second groove 143.

Figure 4:
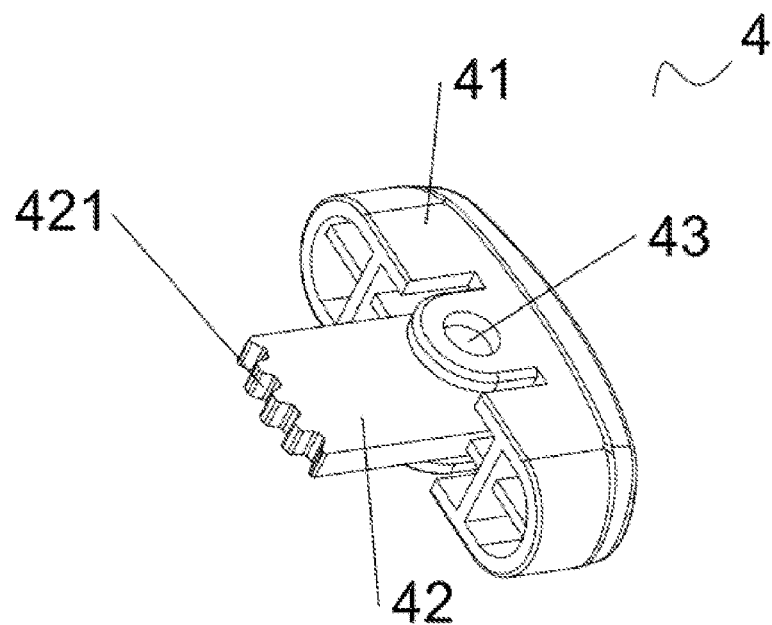
FIG. 4 is a three-dimensional schematic view of a structure of a driving mechanism according to an embodiment of the disclosure.

As shown in FIG. 1 and FIG. 4, the adjusting device includes a driving mechanism 4 and a rotating mechanism 5. The driving mechanism 4 includes a rocker button 41 and a driving plate 42. Two shaft holes 43 are disposed in symmetrical positions of two outer side walls of the rocker button 41 parallel to a bottom wall of the head portion 1. One end of the driving plate 42 is fixed inside the rocker button 41, and the other end of the driving plate 42 is provided with a driving rack 421 and extends into the inner cavity of the cylinder of the head portion 1.

Figure 5:
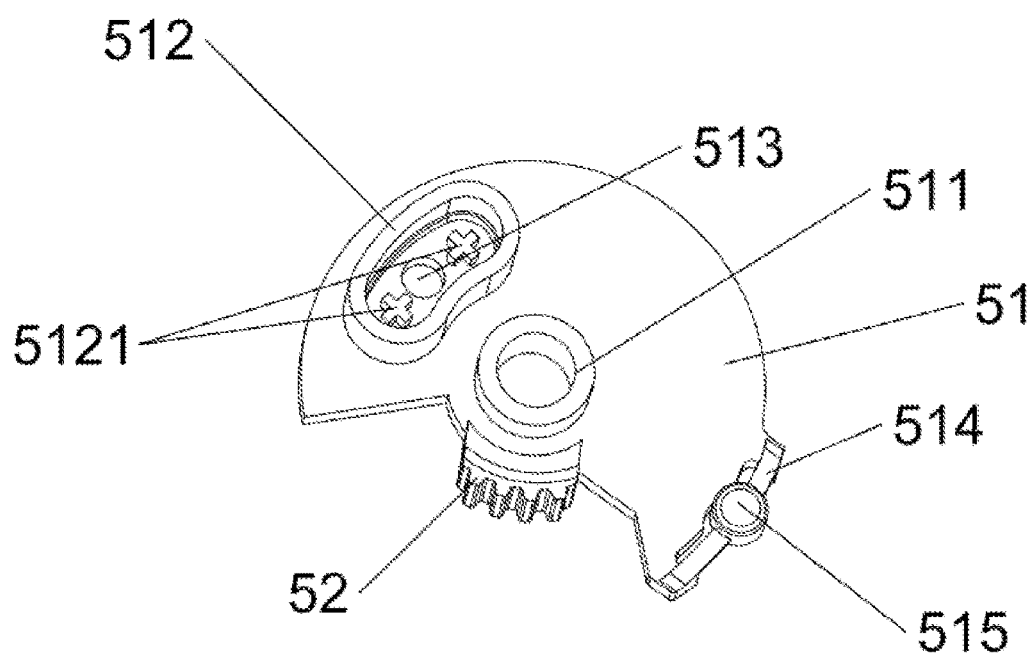
FIG. 5 is a three-dimensional schematic view of a structure of a rotation plate according to an embodiment of the disclosure.
Figure 6:
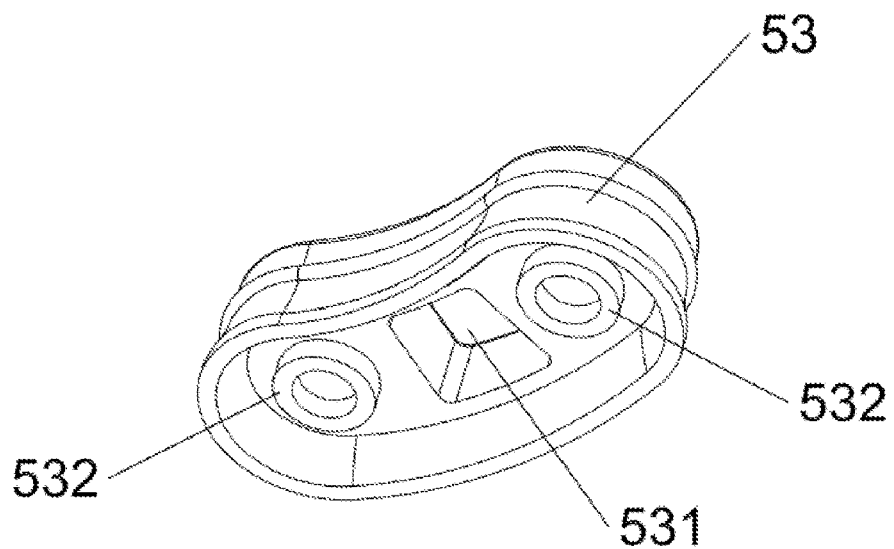
FIG. 6 is a three-dimensional schematic view of a structure of a second leather cup according to an embodiment of the disclosure.

As shown in FIG. 5 and FIG. 6, the rotating mechanism 5 includes a rotation plate 51, a transmission rack 52, and a second leather cup 53. The rotation plate 51 is generally a fan-shaped structure, and a first shaft sleeve 511 protrudes from a central position of the rotation plate 51. An inner hole of the first shaft sleeve 511 is fitted to the rotating shaft body 121 of the first rotating shaft 12, and the inner hole of the first shaft sleeve 511 penetrates the rotation plate 51. A second installation groove 512 protrudes from a surface, from which the first shaft sleeve 511 protrudes, of one side of the rotation plate 51. A bottom portion of the second installation groove 512 is provided with a second water passage hole 513 and two symmetrical cross-shaped second protruding ribs 5121 extending in an opening direction of the second installation groove 512. The two second protruding ribs 5121 are located on two sides of the second water passing hole 513. An elastic spring plunger is fixedly disposed at the surface of the rotation plate 51 provided with the second installation groove 512, the elastic spring plunger is located at a periphery of the rotation plate 51 and away from the second installation groove 512. The elastic spring plunger includes an elastic spring plunger body 515 and an elastic arc-shaped fixing plate 514. The arc-shaped fixing plate 514 is fixedly connected onto the rotation plate 51, and the spring plunger body 515 is fixedly connected to a top end of the arc-shaped fixing plate 514.

The transmission rack 52 is an arc-shaped rack. The transmission rack 52 and the rotation plate 51 are coaxially and fixedly connected to an arc-shaped side wall of the rotation plate 51 close to the first shaft sleeve 511. Teeth of the transmission rack 52 are disposed in a direction away from the rotation plate 51.

The second leather cup 53 is made of an elastic material, and a third water passage hole 531 penetrates a bottom portion of the second leather cup 53. An inner wall of the bottom portion of the second leather cup 53 is provided with two second protruding blocks 532 opposite to the second protruding ribs 5121 on the bottom portion of the second installation groove 512. A sealing rib fitted to the groove wall of the second installation groove 512 is disposed on an outer side wall of a leather cup body of the second leather cup 53.

As shown in FIG. 1, the first elastic members 6 include three springs.

As shown in FIG. 1, the second elastic member 7 includes one spring.

Figure 7:
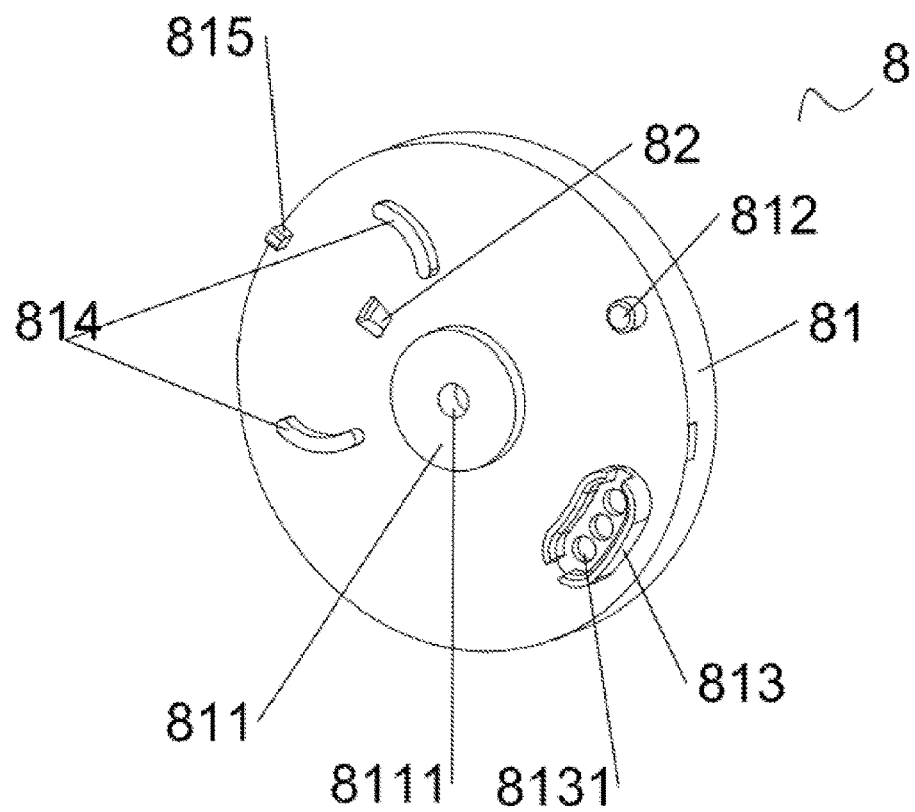
FIG. 7 is a three-dimensional schematic view of a structure of a water dispensing plate from a first viewing angle according to an embodiment of the disclosure.

As shown in FIG. 7, the water dispensing plate 8 includes a water dispensing plate body 81. The water dispensing plate body 81 is a circular surface plate, and a surface of one side of the water dispensing plate 81 is provided with a third protruding column 811, a third rotating shaft 812, a positioning groove 813, two opposite blocking walls 814, and an inserting block 815. The third protruding column 811 is disposed in a central position of the water dispensing plate body 81, and the central position is provided with a first screw hole 8111 penetrating the water dispensing plate 8. The third rotating shaft 812 protrudes from a position opposite to the second rotating shaft 13. Three positioning holes 8131 distributing in the circumferential direction are disposed inside a bottom portion of the positioning groove 813. Openings are provided on groove walls of the positioning groove 813 at front and tail ends of the positioning holes 8131, and the groove walls of the positioning groove 813 are configured to guide the elastic spring plunger. The two blocking walls 814 are disposed on two sides of the first water passage hole 82, and the two blocking walls 814 are configured to block and limit the second leather cup 53. The inserting block 815 protrudes from a position opposite to the inserting groove 16 of the head portion 1.

Figure 8:
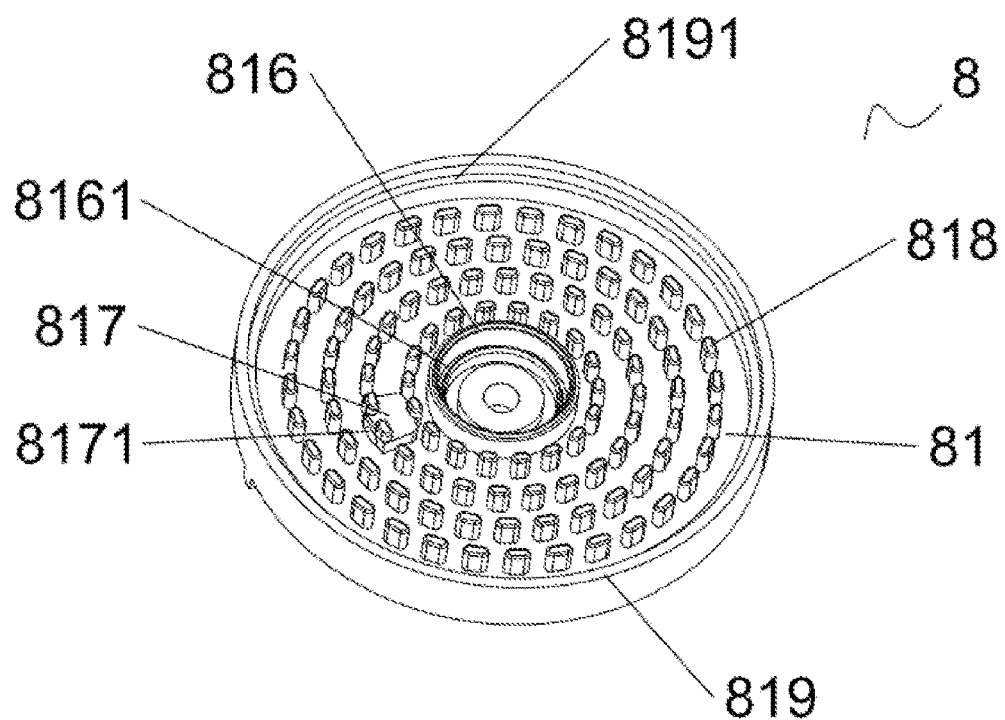
FIG. 8 is a three-dimensional schematic view of the structure of the water dispensing plate from a second viewing angle according to an embodiment of the disclosure.

As shown in FIG. 8, a second ring wall 816, a boss 817, a plurality of fourth protruding columns 818, and a third ring wall 819 protrude from a surface of the other side of the water dispensing plate body 81. The second ring wall 816 is disposed outside the first screw hole 8111, is coaxial with the first screw hole 8111, and is internally provided with a first step surface 8161 away from an open end of the positioning groove 813. The boss 817 extends from a hole edge of the first water passage hole 82 and is internally provided with a cavity, and a side wall of one side of the boss 817 perpendicular to the water dispensing plate body 81 is provided with a fourth water passage hole 8171 communicating with the first water passage hole 82. The fourth protruding columns 818 are uniformly distributed outside the second ring wall 816 in a concentric circle. Each of the fourth protruding columns 818 located within the boss 817 extends from an outer wall of the boss 817 parallel to the water dispensing plate body 81, and the rest of the fourth protruding columns 818 extend from the water dispensing plate body 81. The third ring wall 819 protrudes from a peripheral edge of the water dispensing plate body 81, and a second step surface 8191 away from the open end of the positioning groove 813 is disposed on an inner wall of the third ring wall 819 in the circumferential direction.

Figure 9:
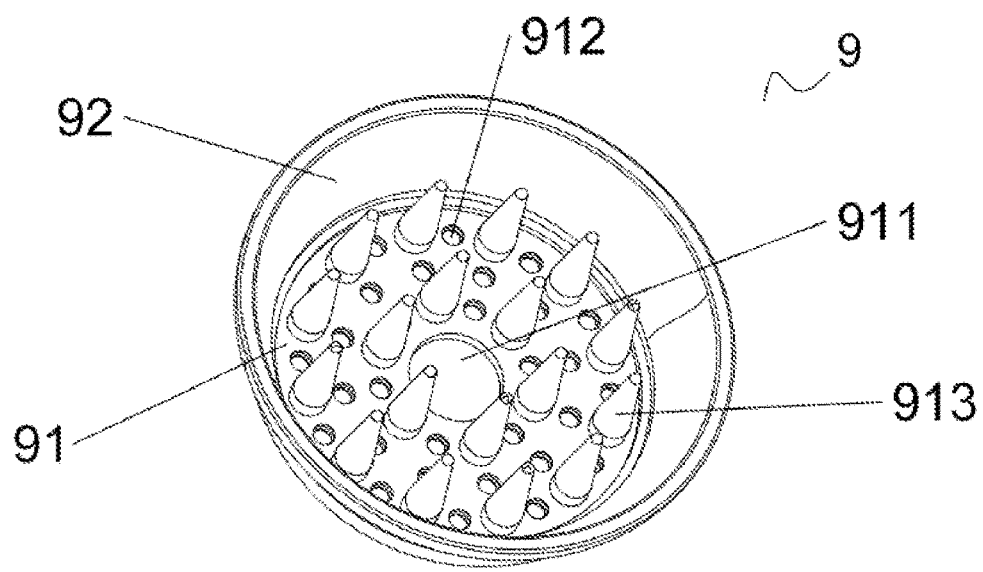
FIG. 9 is a three-dimensional schematic view of a structure of a brush sleeve according to an embodiment of the disclosure.
Figure 14:
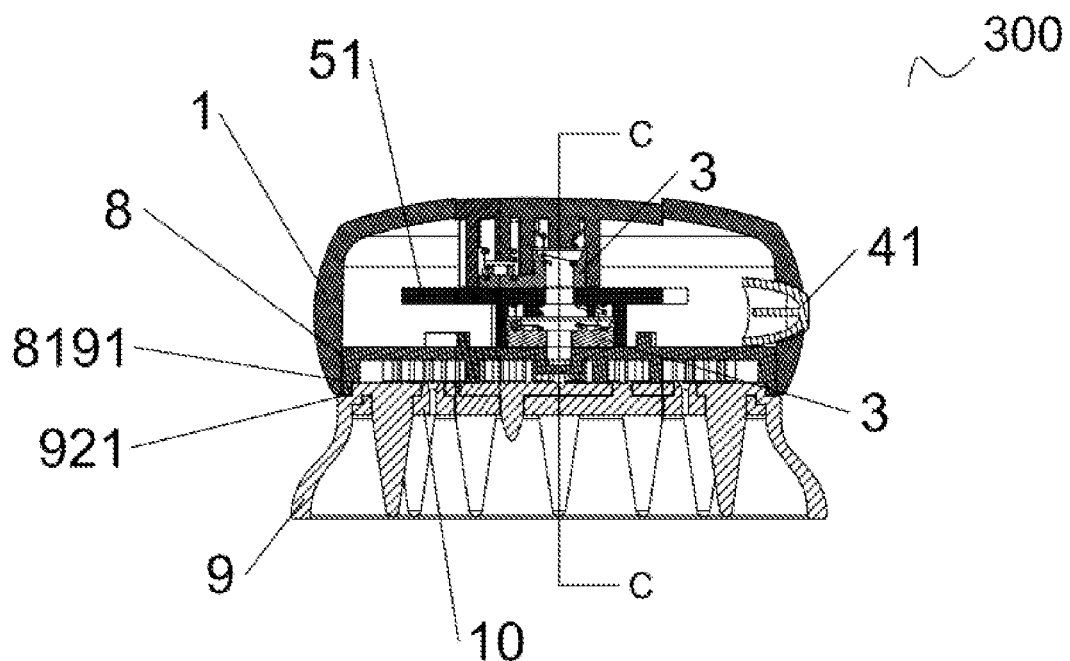
FIG. 14 is a cross-sectional schematic view taken along a line A-A in FIG. 13 according to an embodiment of the disclosure.

As shown in FIG. 14 and FIG. 9, the surface cover assembly includes a brush sleeve 9 and a surface cover 10. The brush sleeve 9 includes a brush sleeve body 91 and an outer rubber sleeve 92, and the brush sleeve body 91 is a circular surface plate. A first through hole 911 penetrates a central position of the brush sleeve 9, and second water outlets 912 penetrate the rest position of the brush sleeve 9 except the central position. The second water outlets 912 and the fourth protruding columns 818 are arranged in a staggered manner. A plurality of comb teeth 913 protrude from a surface of one side of the brush sleeve body 91, and the comb teeth 913 and the second water outlets 912 are arranged in a staggered manner. The comb teeth are made of silica gel and thus are soft and comfortable. The comb teeth may be used to comb and clean the pet's hair while washing the pet and thereby may be conveniently used without purchasing an additional hair comb. The outer rubber sleeve 92 has an annular trumpet shape and extends in an extending direction of the comb teeth 913 from a periphery edge of a surface of one side of the brush sleeve body 91 provided with the comb teeth 913, and form with the brush sleeve body 91 a third step surface 912 away from the comb teeth 913. The outer rubber sleeve 92 may be used to prevent water from splashing around during a process of grooming the pet.

Figure 10:
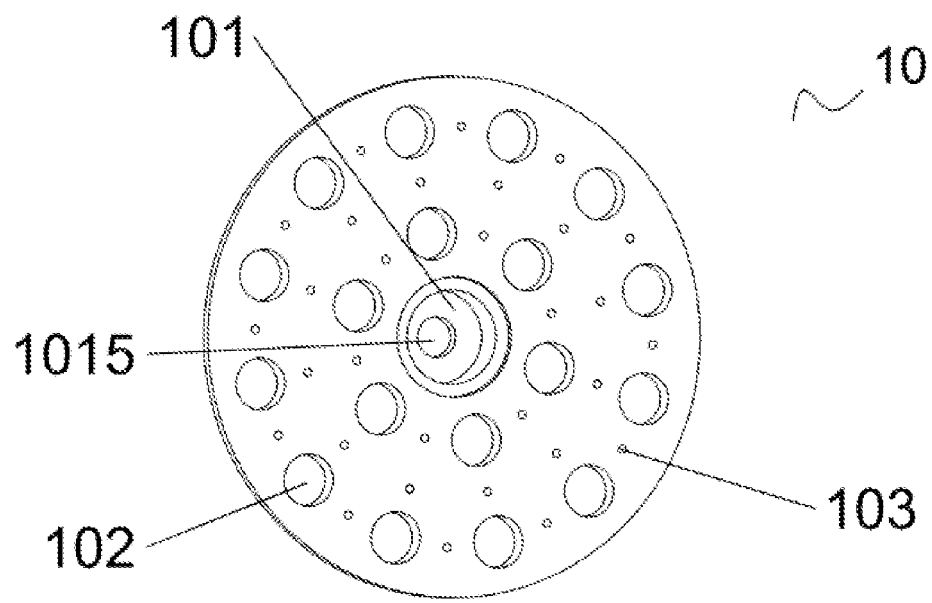
FIG. 10 is a three-dimensional schematic view of a structure of a surface cover according to an embodiment of the disclosure.
Figure 11:
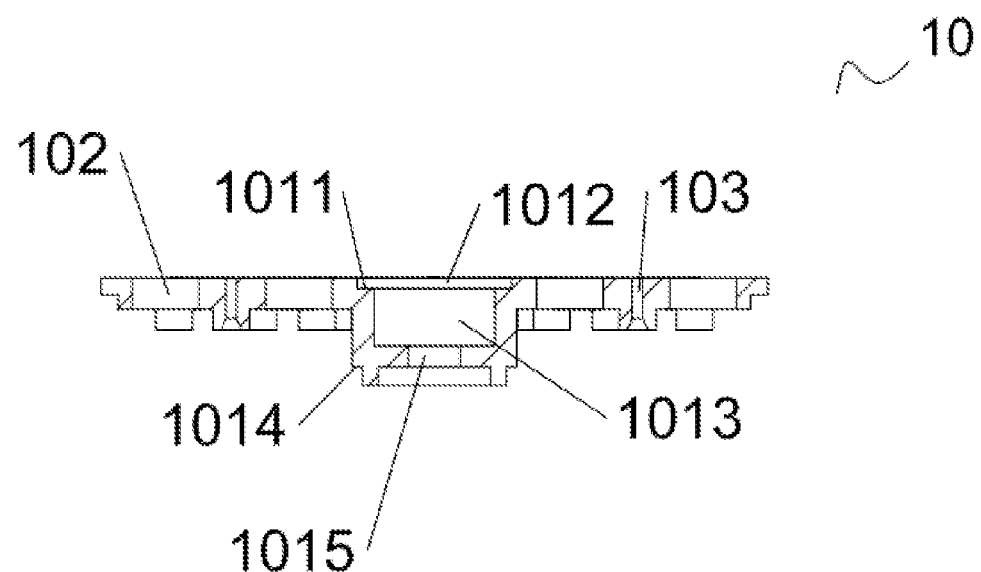
FIG. 11 is a cross-sectional schematic view of the surface cover according to an embodiment of the disclosure.

As shown in FIG. 10 and FIG. 11, the surface cover 10 has a circular surface plate structure, and a central position of the surface cover 10 is provided with a third installation groove 101. An open end of the third installation groove 101 is located on a surface of one side of the surface cover 10, and the other end of the third installation groove 101 is disposed on a surface of the other side of the surface cover 10. A fourth step surface 1011 facing towards the open end of the third installation groove 101 is disposed in the third installation groove 101 to form a first cavity 1012 and a second cavity 1013. A fifth step surface 1014 away from the open end of the third installation groove 101 is disposed on an outer wall of a bottom portion of the third installation groove 101. A second screw hole 1015 communicating with the first screw hole 8111 is disposed on the bottom portion of the third installation groove 101. A plurality of comb tooth holes 102 fitted to the comb teeth 913 of the brush sleeve 9 and a plurality of third water outlets 103 penetrate the surface cover 10.

As shown in FIG. 1 and FIG. 14, a screw 100 is configured to fix the water dispensing plate 8 and the surface cover 10 onto the head portion 1.

Figure 12:
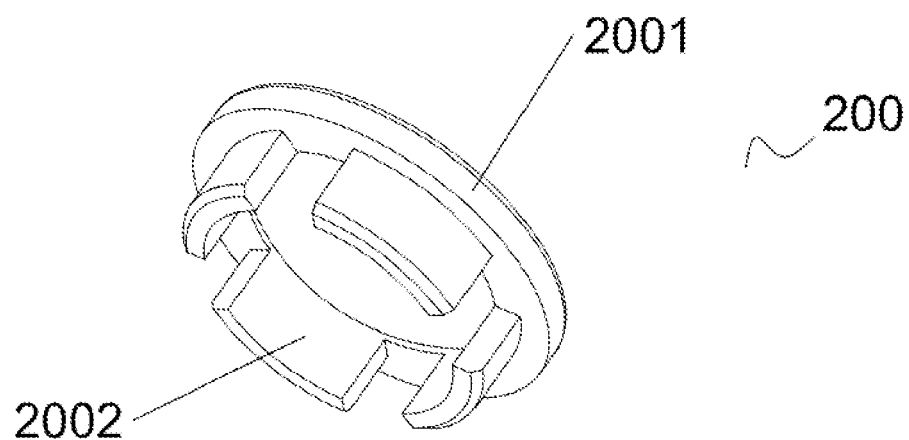
FIG. 12 is a three-dimensional schematic view of a structure of a decoration cover according to an embodiment of the disclosure.
Figure 13:
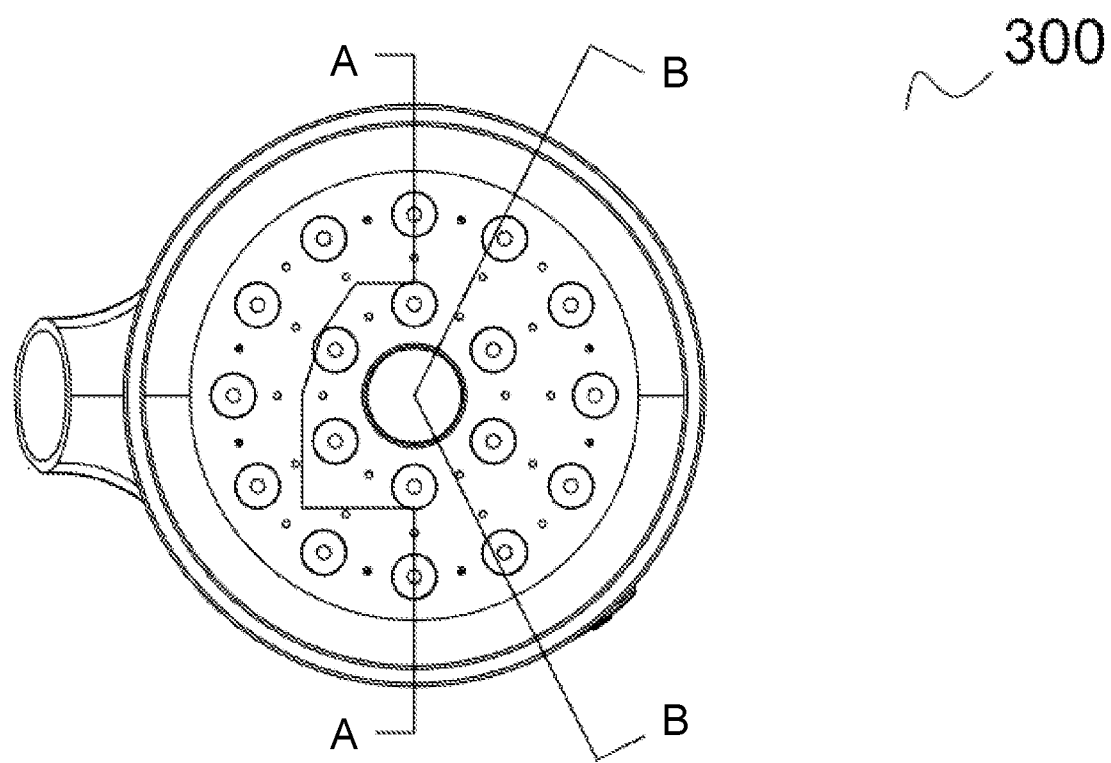
FIG. 13 is a three-dimensional schematic view of assembly of the shower head for pets according to an embodiment of the disclosure.

As shown in FIG. 12, the decoration cover 200 is provided, and the decoration cover 200 includes a decoration cover body 2001 and a plurality of inserting pieces 2002. The decoration cover body 2001 is a circular surface cover, and an outer diameter of the decoration cover body 2001 is fitted to a cavity diameter of the first cavity 1012 of the third installation groove 101 of the surface cover 10. A plurality of inserting pieces 2002 are evenly distributed on a surface of one side of the decoration cover body 2001, and an outer diameter of a circle enclosed by each of the inserting pieces 2002 is fitted to a cavity diameter of the second cavity 1013 of the third installation groove 101 of the surface cover 10.

As shown in FIG. 1 and FIG. 13 to FIG. 16, in this embodiment, during installation, the driving plate 42 on the rocker button 41 extends into the inner cavity of the cylinder of the head portion 1 first, and the second rotating shaft 13 is then inserted into the shaft hole 43 of the rocker button 41 facing towards the inner wall of the bottom portion of the head portion 1. Next, one end of one spring among the first elastic members 6 is sleeved outside the first protruding rib 144 of the second groove 143 of the first installation groove 14. One end of the spring of the second elastic member 7 is then sleeved outside the protrusion 145 of the first groove 142 of the first installation groove 14. The first leather cup 3 is then hermetically installed in the first installation groove 14. The sealing protruding rib on the sealing sleeve 33 of the first leather cup 3 hermetically abuts against the groove wall of the first groove 142, water leakage is thus prevented from occurring in the first installation groove 14, and the adjusting device is prevented from being soaked in water. Herein, the sealing sleeve 33 of the first leather cup 3 and the first water outlet 32 are located in the first groove 142 and form the water outflow end of the water inlet channel. The other end of the second elastic member 7 abuts against the hole edge of the first water outlet 32 located at one end of the first groove 142. The other end of the first elastic member 6 sleeved on the first protruding rib 144 on the bottom portion of the second groove 143 is sleeved outside the first protruding block 34 of the first leather cup 3 and abuts against a surface of the leather cup body 31 opposite to the second groove 143. Next, one ends of the two remaining springs among the first elastic members 6 are respectively sleeved outside the two second protruding ribs 5121 on the bottom portion of the second installation groove 512. The second leather cup 53 is hermetically installed in the second installation groove 512 next, water leakage is thus prevented from occurring in the second installation groove 512, and the adjusting device is prevented from being soaked in water. The other ends of the two springs sleeved outside the second protruding ribs 5121 on the bottom portion of the second installation groove 512 are respectively sleeved outside the second protruding blocks 532 corresponding to the inner wall of the bottom portion of the second leather cup 53 and abut against the inner wall of the bottom portion of the second leather cup 53. Herein, the third water passage hole 531 directly faces the second water passage hole 513.

Next, the first shaft sleeve 511 of the rotation plate 51 of the rotating mechanism 5 is sleeved on and rotatably fitted to the rotating shaft body 121 of the first rotating shaft 12, so that the surface of the rotation plate 51 away from the second installation groove 512 abuts against the position-limiting surface of the first rotating shaft 12. The rotation plate 51 is adjusted, and the transmission rack 52 on the rotation plate 51 is thereby meshed with the driving rack 421 on the driving plate 42. The surface of the water dispensing plate 8 provided with the third protruding column 811 faces the first rotating shaft 12, and in this way, the third protruding column 811 abuts against the rotating shaft body 121 of the first rotating shaft 12. Herein, the inserting block 815 on the water dispensing plate 8 is inserted in the inserting groove 16 inside the head portion 1. The third rotating shaft 812 is inserted in the shaft hole 43 of the rocker button 41 opposite to the third rotating shaft 812 and is fitted to the second rotating shaft 13, such that rocker button 41 is rotatably fitted to the head portion 1. The arc-shaped fixing plate 514 of the elastic spring plunger is inserted in the positioning groove 813 through the two openings on the positioning groove 813. In this way, the spring plunger body 515 is located in any positioning hole 8131 inside the positioning groove 813, and stability of positioning of the rotating mechanism 5 is enhanced, and the sense of gear shifting is also improved during switching. The elastic spring plunger is configured to be positioned through abutting against the positioning groove 813 when the rotation plate 51 rotates. Herein, the blocking walls 814 on two sides of the first water passage hole 82 are located on two sides of the second leather cup 53. The second leather cup 53 on the rotation plate 51 hermetically abuts against the water dispensing plate 8, and a surface of the rotation plate 51 away from the second leather cup 53 hermetically abuts against the first leather cup 3. Through arrangement of the first elastic members 6 and the second elastic member 7, the first leather cup 3 and the second leather cup 53 are ensured to always abuts against the rotation plate 51 and the water dispensing plate 8 respectively, water leakage is thus effectively prevented from occurring, and the adjusting device is prevented from being soaked in water.

Next, a surface of the brush sleeve 9 facing away from the comb teeth 913 faces the water dispensing plate 8, so that the third step surface 921 abuts against the third ring wall 819 on the water dispensing plate 8. A surface of the brush sleeve body 91 facing towards the water dispensing plate 8 abuts against and is fitted to the second step surface 8191 of the water dispensing plate 8. A side wall of the brush sleeve body 91 hermetically abuts against an inner wall of the third ring wall 819 of the water dispensing plate 8 in the circumferential direction, and the fourth protruding columns 818 on the water dispensing plate 8 abut against a surface of the brush sleeve 9 opposite to the water dispensing plate 8. A surface of the surface cover 10 away from the open end of the third installation groove 101 faces the brush sleeve 9, and the comb teeth 913 then penetrate the comb tooth holes 102 of the surface cover 10. In this way, the third installation groove 101 passes through the first through hole 911 of the brush sleeve 9, the second screw hole 1015 on the bottom portion of the third installation groove 101 is aligned with the first screw hole 8111 on the water dispensing plate 8, and the fifth step surface 1014 of the surface cover 10 abuts against the first step surface 8161 of the water dispensing plate 8. Next, the screw 100 passes through the second screw hole 1015 and the first screw hole 8111 in sequence and is screwed to the threaded hole 1211 in the rotating shaft body 121 of the first rotating shaft 12 to fix the water dispensing plate 8 and the surface cover 10 onto the rotating shaft body 121 of the first rotating shaft 12. Herein, the rotation plate 51 is sandwiched between the water dispensing plate 8 and the position-limiting surface, and the brush sleeve 9 is clamped and fixed by the water dispensing plate 8 and the surface cover 10. A surface of the water dispensing plate 8 facing the bottom wall of the head portion 1 and the inner wall of the cylinder of the head portion 1 hermetically enclose and form an installation cavity. The adjusting mechanism is located inside the installation cavity. The water dispensing plate 8 and the surface cover assembly hermetically enclose and form a water outflow cavity, and the first water passage hole 82 on the water dispensing plate 8 communicates with the water outflow cavity.

Next, the inserting pieces 2002 of the decoration cover 200 extend into the second cavity 1013 of the third installation groove 101 and are in interference fit with the second cavity 1013. The decoration cover body 2001 is located in the first cavity 1012 of the third installation groove 101 of the surface cover 10, and the decoration cover 200 covers the screw 100, so that a favorable appearance of the shower head as a whole is provided.

As shown in FIG. 16, during implementation, in this embodiment, the handle portion 2 is configured to communicate with the external water outlet, and water flows into the head portion 1 through the water inlet channel. When flowing inside the head portion 1, water may only flow out of the water inlet channel from the first water outlet 32 of the first leather cup 3, water flows towards the second leather cup 53 through the second water passage hole 513 on the rotation plate 51, and flows out through the third water passage hole 531. The water then enters the water outflow cavity after passing through the first water passage hole 82 and the fourth water passage hole 8171 of the water dispensing plate 8. The water then flows through the second water outlet 912 of the brush sleeve 9 and is sprayed from the third water outlet 103 of the surface cover 10. The water may not flow into other positions of the installation cavity, so the adjusting device may not be soaked in the water, and a low switching pressure is generated when a flowing amount is adjusted through the adjusting device.

Figure 17:
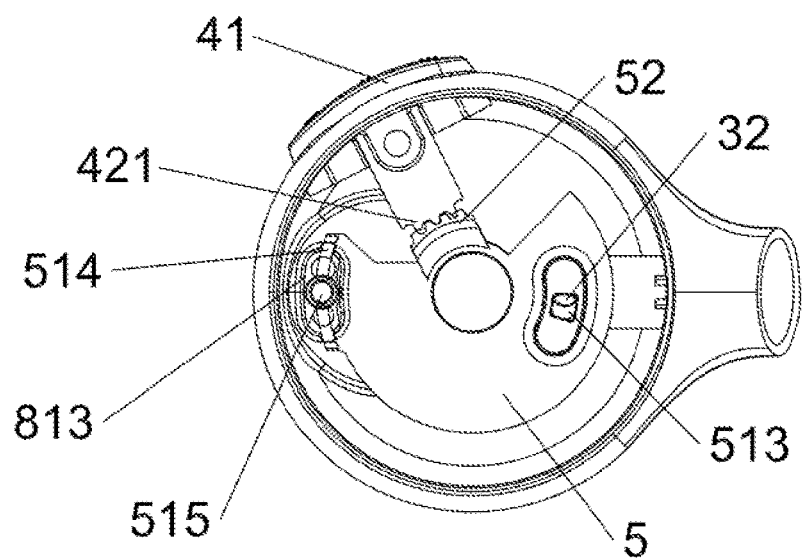
FIG. 17 is schematic view of the shower head for pets in a low water outflow mode according to an embodiment of the disclosure.
Figure 18:
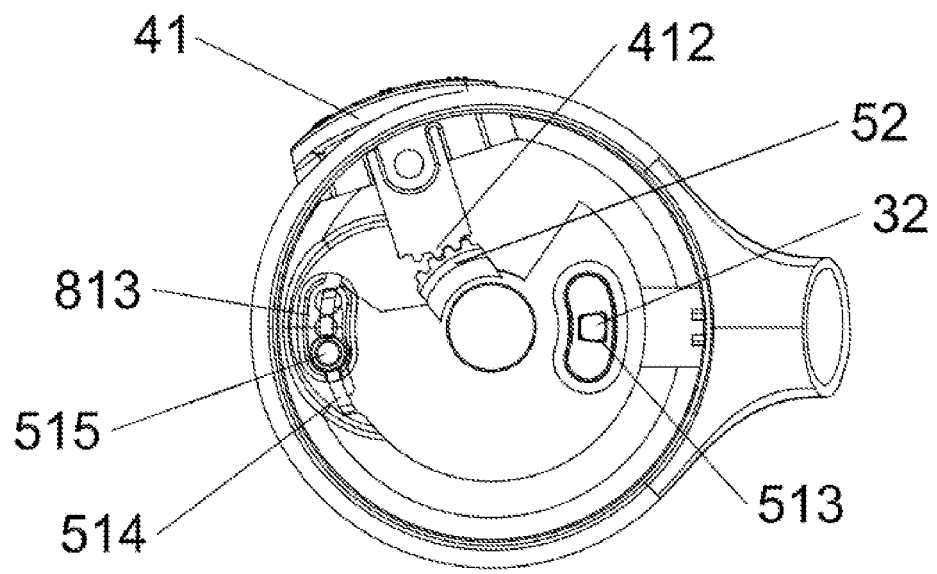
FIG. 18 is schematic view of the shower head for pets in a high water outflow mode according to an embodiment of the disclosure.
Figure 19:
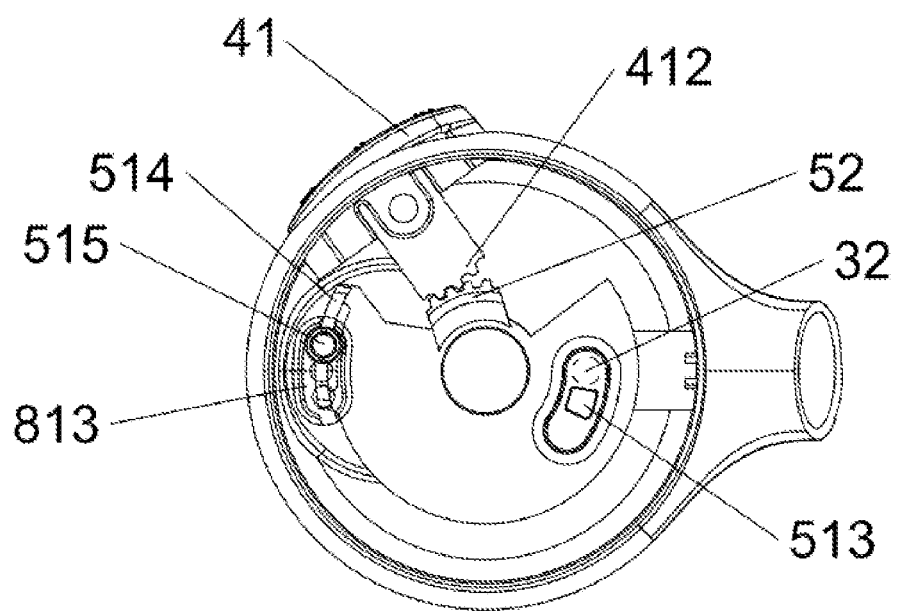
FIG. 19 is schematic view of the shower head for pets in a water outflow pause mode according to an embodiment of the disclosure.

As shown in FIG. 17 to FIG. 19, in an initial state, the spring plunger body 515 of the shower head is located in the positioning groove 813 in the middle part. Herein, a water outflow area which is formed by the overlapped area of the first water outlet 32 on the first leather cup 3 and the second water passage hole 513 on the rotation plate 51 is only half of the first water outlet 32, which is a low water outflow mode. In the initial state, one end of the rocker button 41 of the shower head close to the handle portion 2 is pressed, and the rocker button 41 drives the driving plate 42 to rotate counterclockwise. The driving rack 421 drives the transmission rack 52, so that the rotation plate 51, after rotating counterclockwise, is meshed with the transmission rack 52 through the driving rack 421 for positioning. During this process, the spring plunger body 515 moves relative to the rotation plate 51 in a clockwise direction into the adjacent positioning hole 8131 to perform positioning at the same time. Herein, the first water outlet 32 on the first leather cup 3 completely overlaps the second water passage hole 513 on the rotation plate 51, which is a high water outflow mode. Herein, the second leather cup 53 is blocked by the blocking wall 814 close to the second leather cup 53. In the initial state, one end of the rocker button 41 of the shower head away from the handle portion 2 is pressed, and the rocker button 41 drives the driving plate 42 to rotate clockwise. The driving rack 421 drives the transmission rack 52, so that the rotation plate 51, after rotating clockwise, is meshed with the transmission rack 52 through the driving rack 421 for positioning. During this process, the spring plunger body 515 moves relative to the rotation plate 51 in a counterclockwise direction into the adjacent positioning hole 8131 to perform positioning at the same time. Herein, the first water outlet 32 on the first leather cup 3 is blocked by a plate surface of the rotation plate 51 next to the second water passage hole 513, and a minimum overlapping area is provided, which is a water outflow pause mode. Herein, the second leather cup 53 is blocked by the blocking wall 814 close to the second leather cup 53. On the first leather cup 3, only the leather cup wall located at the inner side of the groove wall of the first groove 142 is impacted by a water pressure because the remaining part is separated by the first groove 142. In this way, when water outflowing is paused, the received water pressure is reduced, and when switching is performed again, less switching pressure is generated. By pressing the rocker button 41, the shower head 300 for pets may be adjusted to be switched between the three modes of the low water outflow mode, the high water outflow mode and the water outflow pause mode. It should be understood that, in this embodiment, the driving rack 421 and the transmission rack 52 rotate at the same angle and may also rotate at multiple angles by setting the two racks to be provided with different diameters. Arrangement of the spring plunger body 515 and the positioning groove 813 is to enhance the stability of positioning and the sense of gear shifting, and if the positioning groove 813 is removed, the spring plunger body 515 abuts against the water dispensing plate 8, and a flowing amount may also be adjusted without obvious gear shifting. In the case that the positioning groove 813 is removed or more positioning holes 8131 are added, by increasing the numbers or sizes of the water passage holes and adding corresponding passage waterways in the water outflow cavity, water outflowing may be switched and the flowing amount may be adjusted at the same time.

Although the description of the specification and embodiments provided above serve to explain the scope of the disclosure, such description should not be construed as limitations on the scope of the disclosure. Through inspiration provided by the disclosure or the embodiments, modifications, equivalents, or other improvements of the embodiments or part of the technical features of the disclosure obtained by people having ordinary skill in the art by combining general knowledge and common technical knowledge in the art and/or existing art through logical analyses, reasoning, or limited tests fall within the protection scope of the disclosure.

What is claimed is:

1. A shower head for pets, the shower head comprising:
a shower head body, provided with a water inlet channel;
a first leather cup, hermetically fixed onto the water inlet channel, wherein a first water outlet penetrates the first leather cup, and the first water outlet communicates with the water inlet channel;
a surface cover assembly;
a water dispensing plate, fixedly connected to the shower head body, located between the shower head body and the surface cover assembly, wherein two sides of the water dispensing plate respectively cooperate with the shower head body and the surface cover assembly to hermetically enclose an installation cavity and a water outflow cavity, and the water dispensing plate is provided with a first water passage hole communicating with the water outflow cavity and penetrating the water dispensing plate;
the surface cover assembly is provided with a plurality of comb teeth extending in a direction away from the water dispensing plate; and
an adjusting device, including a driving mechanism and a rotating mechanism, wherein the driving mechanism is rotatably connected to the shower head body,
wherein the rotating mechanism is located inside the installation cavity and hermetically abuts against the first leather cup and the water dispensing plate respectively, the rotating mechanism is provided with a second water passage hole, and the driving mechanism drives the rotating mechanism to rotate and to adjust a water outflow area which is formed by an overlapped area of the first water outlet and the second water passage hole, a first installation groove is formed at one end of the water inlet channel located in the shower head body, and the first leather cup is hermetically fixed in the first installation groove, the driving mechanism comprises a rocker button and a driving plate, the rocker button is rotatably connected to the shower head body, one end of the driving plate is fixed onto the rocker button, and the other end of the driving plate extends into the installation cavity of the shower head body and is provided with a driving rack, the rotating mechanism includes a transmission rack rotatably meshed with the driving rack, the rotating mechanism further includes a rotation plate and a second leather cup, the rotation plate is rotatably connected to the shower head body and is located in the installation cavity, a surface of the rotation plate facing away from the water dispensing plate abuts against the first leather cup, a surface of the rotation plate facing the water dispensing plate is provided with a second installation groove that has an opening facing the water dispensing plate, and the second water passage hole is located on a bottom portion of the second installation groove, the second leather cup is hermetically fixed inside the second installation groove and abuts against the water dispensing plate, a third water passage hole penetrates the second leather cup, and the third water passage hole is configured to communicate with the first water passage hole, and the transmission rack has an arc shape and is fixed onto the rotation plate.

2. The shower head for pets according to claim 1, wherein a first rotating shaft extending towards the water dispensing plate is disposed in the installation cavity of the shower head body, and an outer wall of the first rotating shaft is provided with a position-limiting surface, and the rotation plate is sleeved on the first rotating shaft and is sandwiched between the position-limiting surface and the water dispensing plate.

3. The shower head for pets according to claim 1, the shower head further comprising a plurality of first elastic members, a surface of the first leather cup facing the first installation groove and a surface of the second leather cup facing the rotation plate are both provided with a plurality of protruding blocks, and a bottom portion of the first installation groove and the bottom portion of the second installation groove are both provided with protruding ribs respectively opposite to the protruding blocks, and one end of each of the first elastic members is sleeved outside one of the protruding blocks, and the other end of each of the first elastic members is sleeved outside a corresponding one of the protruding ribs opposite to the one of the protruding blocks.

4. The shower head for pets according to claim 3, further comprising a second elastic member, wherein a plurality of partitions are disposed in the first installation groove, each of the partitions and the bottom portion and a groove wall of the first installation groove cooperatively enclose a water passage groove, and the water passage groove hermetically communicates with the first water outlet to form a water outflow end of the water inlet channel, the protruding ribs are disposed on the bottom portion, located outside the water passage groove, of the first installation groove, the bottom portion of the water passage groove is provided with a protrusion, one end of the second elastic member is sleeved outside the protrusion, and the other end of the second elastic member abuts against the first leather cup.

5. The shower head for pets according to claim 1, wherein the surface of the rotation plate facing the water dispensing plate is provided with an elastic spring plunger abutting against the water dispensing plate, the water dispensing plate is circumferentially provided with a positioning hole fitted to the elastic spring plunger, and the elastic spring plunger is configured to abut against a positioning groove for positioning when the rotation plate rotates.

6. The shower head for pets according to claim 2, wherein the surface cover assembly includes a brush sleeve and a surface cover, the brush sleeve abuts against the water dispensing plate, a plurality of second water outlets communicating with the water outflow cavity penetrate the brush sleeve in a circumferential direction, the comb teeth protrude from a surface of the brush sleeve facing away from the water dispensing plate, and the comb teeth and the second water outlets are arranged in a staggered manner, and the surface cover covers the brush sleeve, and is fixed onto the first rotating shaft, the surface cover is provided with a plurality of third water outlets facing the second water outlets and a plurality of comb tooth holes for the comb teeth to extend thereout.

7. The shower head for pets according to claim 6, wherein a peripheral edge of the surface of the brush sleeve facing away from water dispensing plate is provided with an outer rubber sleeve in the circumferential direction.

8. The shower head for pets according to claim 1, wherein an outer wall of the shower head body away from the surface cover assembly is provided with a hand fastener.

* * * * *